(12) United States Patent
Klimek et al.

(10) Patent No.: US 9,929,389 B2
(45) Date of Patent: Mar. 27, 2018

(54) BATTERY DEVICE AND METHOD OF PRODUCTION THEREOF

(71) Applicant: Dr. Ing. h.c. F. Porsche Aktiengesellschaft, Stuttgart (DE)

(72) Inventors: Stanislaw Klimek, Frankfurt am Main (DE); Bernd Palmer, Aidlingen (DE); Matthias Herntier, Friolzheim (DE); Ralf Keller, Niefern-Öschelbronn (DE); Florian Scheerer, Rutesheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 15/213,803

(22) Filed: Jul. 19, 2016

(65) Prior Publication Data

US 2017/0025655 A1    Jan. 26, 2017

(30) Foreign Application Priority Data

Jul. 20, 2015  (DE) .................. 10 2015 111 749

(51) Int. Cl.
*H01M 2/10* (2006.01)
*H01M 10/613* (2014.01)
(Continued)

(52) U.S. Cl.
CPC ............ *H01M 2/1077* (2013.01); *B60K 1/04* (2013.01); *B60L 11/1877* (2013.01);
(Continued)

(58) Field of Classification Search
CPC . H01M 2/1077; H01M 10/613; H01M 10/625
See application file for complete search history.

(56) References Cited

U.S. PATENT DOCUMENTS

2008/0124622 A1* 5/2008 Hamada .............. H01M 2/1077
                                                         429/149
2012/0121959 A1   5/2012 Yamada
(Continued)

FOREIGN PATENT DOCUMENTS

JP    2000038035 A    2/2000
JP    2015079605 A    4/2015
(Continued)

OTHER PUBLICATIONS

German search report for German Application No. 102015111749.5, dated Feb. 24, 2016 with partial translation.
(Continued)

*Primary Examiner* — Olatunji Godo
(74) *Attorney, Agent, or Firm* — RatnerPrestia

(57) ABSTRACT

A battery device for an at least partially electrically operated vehicle and a method for producing the battery device. The battery device includes a plurality of battery modules, each having at least one battery cell, and a receiving device for receiving the battery modules. In this arrangement, the receiving device includes a dividing wall, which is arranged underneath the battery modules, and a base plate, which is arranged underneath the dividing wall. The dividing wall and the base plate are attached to at least one connecting element and are connected to one another by the connecting element while being spaced apart.

17 Claims, 3 Drawing Sheets

(51) Int. Cl.
*H01M 10/625* (2014.01)
*B60K 1/04* (2006.01)
*B60L 11/18* (2006.01)
*H01M 10/6556* (2014.01)

(52) U.S. Cl.
CPC ....... *H01M 2/1094* (2013.01); *H01M 10/613* (2015.04); *H01M 10/625* (2015.04); *B60K 2001/0438* (2013.01); *H01M 10/6556* (2015.04); *H01M 2220/20* (2013.01); *Y10S 903/907* (2013.01)

(56) References Cited

U.S. PATENT DOCUMENTS

2014/0284125 A1    9/2014    Katayama
2015/0249240 A1    9/2015    Hihara et al.

FOREIGN PATENT DOCUMENTS

WO    2013084939 A1    6/2013
WO    2014061109 A1    4/2014

OTHER PUBLICATIONS

Notice of Reasons for Refusal for Japanese Application No. 2016-141299, dated Jul. 5, 2017, 2 pages.
Korean Office Action for Korean Application No. 10-2016-0091579, dated Dec. 20, 2017, 10 pages.

* cited by examiner

BATTERY DEVICE AND METHOD OF PRODUCTION THEREOF

CROSS-REFERENCE TO RELATED APPLICATION

This application claims priority to German Patent Application No. DE 10 2015 111 749.5, filed Jul. 20, 2015, which is incorporated by reference herein in its entirety.

FIELD OF THE INVENTION

The present invention relates to a battery device for an at least partially electrically operated vehicle and to a method for producing a battery device of this kind.

BACKGROUND OF THE INVENTION

The battery devices of electric vehicles and hybrid vehicles often have battery cells which are gathered into groups to form battery modules. Here, the arrangement of the battery modules is often particularly significant since these modules must be accommodated reliably and safely in the battery.

Various ways of accommodating battery modules in a battery have been disclosed in the prior art. However, the known solutions are generally in need of improvement since the battery serves not only as a support for the battery modules but has to perform a number of multifaceted and complex functions. Such requirements are, for example, the cooling of the battery modules, fluid tightness, protection of the battery cells in the event of a crash and protection of the battery cells from below and in the "bollard drop test" and during exceptional events. Moreover, the battery should make a contribution to the overall stiffness of the body. Not least, it should be possible to produce the battery as inexpensively as possible by means of low-cost industrial processes.

SUMMARY OF THE INVENTION

A battery device is provided for an at least partially electrically operated vehicle. The battery device comprises a plurality of battery modules, each having at least one battery cell. The battery device has at least one receiving device for receiving the battery modules. In this arrangement, the receiving device comprises at least one dividing wall, which is arranged underneath the battery modules in an intended operating position. The receiving device furthermore comprises at least one base plate, which is arranged underneath the dividing wall. The dividing wall and the base plate are attached to at least one connecting element. The dividing wall and the base plate are connected to one another by the connecting element while being spaced apart.

The battery device according to aspects of the invention has many advantages. One considerable advantage is that the dividing wall and the base plate are connected to one another by at least one connecting element while being spaced apart. This results in a structurally and functionally improved design of the battery device. Another advantage is that a receiving device of this kind can be produced in a particularly simple and low-cost way. It is also particularly advantageous that a receiving device of this kind makes a significant contribution to the stiffness of the body and makes available improved protection of the battery modules in the event of a crash and in the case of influences from below. Moreover, the spaced arrangement of the base plate and the dividing wall makes it simpler to accommodate a cooling system for the battery modules.

In a particularly preferred embodiment, the connecting element has at least two mutually opposite attachment sections. In particular, the dividing wall and the base plate are fixed on the attachment sections. For example, the attachment section is of planar design. The base plate and/or the dividing wall can be laid against such an attachment section without a gap and fixed. Thus, the connecting element brings about not only spacing but also alignment, considerably simplifying assembly.

The connecting element is preferably designed as an elongate connecting profile. For example, the length of the connecting profile is a multiple of its width and/or height.

Here, the spacing apart of the base plate and the dividing wall is accomplished, in particular, by means of the width or height of the connecting element. In particular, the connecting profile has a rectangular cross section. Other profile configurations are also possible, e.g. a square cross section can be provided. The connecting profile can be of at least partially hollow design. The connecting profile is preferably of solid design. As a particularly preferred option, the connecting profile is manufactured from a metal sheet. The connecting profile can comprise reinforcements and/or applications and/or recesses, e.g. for weight optimization. As a particularly preferred option, the connecting profile is manufactured from a metal sheet, giving an elongate component of solid design with a rectangular cross section.

It is preferred if the longitudinal axis of the connecting element extends transversely to the longitudinal axis of the battery device. Here, the longitudinal axis of the battery device corresponds, in particular, to the envisaged axis of the direction of travel of the carrier vehicle into which the battery device is inserted in the intended state of installation. This results in an advantageous contribution to the overall stiffness of the body in the installed state. At the same time, a certain desired deformability of the receiving device is also possible as a result. The connecting element can also extend parallel to the longitudinal direction of the battery device. It is also possible for both connecting elements that extend transversely and connecting elements that extend longitudinally to be provided.

The connecting element preferably has at least one mounting device for detachably fixing the base plate. It is also possible for the connecting element to have at least one mounting device for detachably fixing the dividing wall. Such a detachable connection of the base plate allows particularly simple and effortless access to the region between the base plate and the dividing wall. In particular, the mounting device is designed for a screw fastener. For example, the mounting device comprises at least one threaded section. For example, the threaded section can be provided in a bore and/or in a blind hole and/or in a press-fit bushing which is inserted into the connecting element. In the sense according to this application, the term "detachable fixing" is taken to mean, in particular, a connection which can be undone nondestructively. A connection that cannot be undone nondestructively can also be provided. For example, the base plate and/or the dividing wall can be attached permanently to the connecting element, e.g. by adhesive bonding and/or welding and/or by some other joining method, in particular a joining method involving material connection.

In an advantageous embodiment, the receiving device comprises a plurality of connecting elements arranged adjacent to one another. The connecting elements are preferably arranged parallel to one another. In particular, at least one cavity is formed in each case between at least some of the connecting elements and preferably between all the connecting elements. In particular, the cavity is bounded at the top by the dividing wall. The cavity is preferably bounded at the bottom by the base plate.

A cavity of this kind contributes both to stability and to weight reduction and can furthermore be used to accommodate additional components. The plurality of connecting elements comprises at least two connecting elements and, in particular, three or four or five or more connecting elements. It is also possible for ten or 15 or 20 or a larger number of connecting elements to be provided. For example, the number of connecting elements is determined in accordance with the number of battery modules. Some of the plurality of connecting elements can be a quarter or half or three quarters or 90% or even more of the connecting elements provided, for example.

The cavity preferably has a height which corresponds to a width and/or height of the connecting elements. Thus, the cavity can be adapted with little effort through the choice of connecting elements. For example, a connecting element with a specific height and/or width can be selected, depending on the desired stiffness and/or intended use of the cavities. The cavity preferably has a rectangular cross section. The cavity preferably has two opposite walls, which are each formed by the dividing wall and the base plate and by two adjacent connecting elements. It is possible for struts and/or reinforcements to be arranged in the cavity. It is also possible for the cavity to be filled with a foam, in particular a foam which hardens.

In an advantageous development, at least one module group is arranged along the cavity. The module group comprises at least one battery module. A module group is preferably provided with at least two or three or more battery modules. The longitudinal axis of the battery modules of a module group can be aligned transversely or parallel to a longitudinal axis of the cavity. As a particularly preferred option, the module group is divided off from the cavity by the dividing wall. Such embodiments have the advantage that the cavity can be used particularly effectively for purposes of cooling and/or supplying and/or connecting the battery modules.

It is possible and preferred for at least one cooling section of a cooling device to extend within the cavity. In particular, the cooling device is suitable and designed for controlling the temperature of the battery modules. In particular, at least one cooling section extends in each cavity. Two or three or a plurality of cooling sections are also possible in the cavity. In particular, the cooling section extends parallel to the connecting elements. The cooling section preferably extends underneath the battery modules. There is preferably a flow of at least one cooling medium through the cooling section.

The cooling section preferably comprises at least one cooling channel or is designed as such. In particular, the cooling channel comprises at least one distinct wall. For example, the cooling channel is manufactured from a tube and/or a hollow profile. For example, the cooling channel can be manufactured from a pressed, drawn or cast aluminum profile. It is also possible for the cooling channel to comprise a wall which is provided by the base plate and/or the dividing wall and/or the connecting element. Particularly advantageous use of installation space is thereby achieved.

It is particularly preferred that the cooling section is attached in a heat-conducting manner to the dividing wall. In particular, the cooling section is attached to a lower side of the dividing wall, which lies opposite an upper side on which the battery modules are arranged. In particular, the cooling section is attached to the side of the dividing wall on which the connecting elements are also mounted. Such an embodiment has the advantage that, on the one hand, reliable and fluid-tight separation of the battery modules and the cooling section is accomplished and, at the same time, the cooling effect is improved. The cooling section is preferably attached to the dividing wall by at least one brazed joint. It is also possible for the cooling section to be adhesively bonded and/or welded. At least one means for improving thermal conductivity, e.g. a heat transfer compound, can be provided between the cooling section and the dividing wall. A cavity can be provided between the cooling section and the base plate. The cavity can be at least partially filled by foam, air or other materials. It is also possible for the cavity to be completely filled by the cooling section. The cooling section can also be attached in a heat-conducting manner to the connecting element.

It is possible and preferred for the receiving device to comprise at least one transverse web. The transverse web is preferably mounted on the dividing wall. In particular, the transverse web extends parallel to the connecting element. The transverse web can also extend transversely to the connecting element. A transverse web of this kind additionally improves the stiffness of the battery device. In this case, the transverse web can also be fixed on the connecting element. For example, a connection which extends through the dividing wall can be provided. It is also possible for the receiving device to comprise at least one longitudinal web.

In a particularly preferred embodiment, the transverse web is mounted on the upper side of the dividing wall in a section where the connecting element is mounted on the lower side of the dividing wall. By virtue of such an arrangement, the transverse web and the connecting element lie opposite one another and are separated from one another by the dividing wall. This has the advantage that forces acting on the transverse web are not absorbed exclusively by the dividing wall but are introduced in a particularly effective manner into the connecting elements. The battery modules are thereby protected in an improved manner.

It is possible for the battery device to comprise at least one battery cover. The battery cover is preferably mounted on the transverse web. In particular, the battery cover is situated above the battery modules. In particular, the battery cover is mounted on a plurality of transverse webs, preferably on all the transverse webs. For this purpose, the transverse web can comprise at least one mounting device. For example, the transverse web can have a threaded bore or a press-fit bushing. The battery cover is preferably screwed to the transverse web. Such embodiments have the advantage that the battery cover contributes to the stiffness of the battery device.

It is preferred if the battery device comprises a plurality of transverse webs arranged adjacent to one another. The transverse webs are preferably arranged parallel to one another. In particular, at least one module group having at least one battery module is in each case arranged between at least some adjacent transverse webs. In particular, at least one module group is in each case arranged between all the transverse webs. It is possible and preferred if the number of transverse webs corresponds to the number of connecting elements. It is also possible for longitudinal webs to be arranged between adjacent transverse webs. Such an arrangement allows particularly secure reception of battery modules in the battery device.

In particular, at least one fastening element for installing the battery modules is mounted on the dividing wall. At least one fastening element per battery module is preferably provided. In particular, at least two opposite fastening elements are provided for each battery module. It is also possible for three or four or more fastening elements to be provided for each battery module on the dividing wall. The number of fastening elements is dependent on the size of the battery module and/or the number of battery cells in the battery module, for example. It is also possible for the fastening element to be fixed on the transverse beam. The fastening element can be fitted detachably or permanently. For this purpose, the fastening element is welded, adhesively bonded, screwed and/or fixed in some other suitable way, for example. In particular, the fastening element is suitable and designed to be connected by being fitted detachably to the battery module. For example, the battery module is screwed and/or latched onto the fastening element. As a particularly preferred option, the fastening element is embodied as a weld stud, which is welded to the dividing wall and to which the battery module is screwed. A very reliable means of accommodating the battery modules and one which is, at the same time, inexpensive to produce is thereby achieved.

In all the embodiments, it is preferred if at least one component of the receiving device is manufactured from a metallic plate material. In this case, the component is, in particular, taken from a group of components which comprises the dividing wall, the base plate, the connecting element, the transverse web and the battery cover. Through the use of the metallic plate material, suitability for industrial production is considerably improved since the components can be manufactured with little effort from semifinished products and can be connected to one another in a very uncomplicated and, at the same time, reliable way. Moreover, such materials offer a significant improvement in the overall stiffness of the body and reliable protection of the battery modules.

The metallic plate material is designed, in particular, as a metal sheet or comprises such a sheet. As a particularly preferred option, the dividing wall and the base plate and the connecting elements as well as the transverse webs are manufactured from a metal sheet. For example, sheets made of aluminum alloys or steel alloys can be used. It is also possible for laminated plate materials composed of different metals to be used. Metallic plate materials into which plastics have been incorporated are also possible. For example, "multi-material sandwich plates" can be used. However, it is also possible for the components to be manufactured from a fiber-reinforced plastic. For example, a thermoplastic with a reinforcement of glass fibers, carbon fibers and/or aramid fibers can be used. In particular, the plate material is of planar design. It is also possible for depressions and/or raised portions to be introduced, e.g. beads. It is also possible for apertures to be introduced, e.g. for weight optimization. It is also possible for reinforcements to be provided on the plate material, e.g. by attaching further plates and/or profiles.

The method according to aspects of the invention is used to produce a battery device for an at least partially electrically operated vehicle. The battery device comprises a plurality of battery modules, each having at least one battery cell. The battery device comprises at least one receiving device for receiving the battery modules. In this case, at least one connecting element is mounted on at least one dividing wall provided underneath the battery modules. At least one base plate provided underneath the dividing wall is mounted on the connecting element. In this case, the base plate and the dividing wall are connected to one another by the connecting element while being spaced apart. The sequence of mounting of the dividing wall and of the base plate on the connecting element is arbitrary here.

The method according to aspects of the invention has the advantage that it can be carried out industrially and at low cost and furthermore allows an advantageous design of a battery device. In particular, the connecting element is mounted on the dividing wall by means of an attachment section. In this case, the base plate is mounted on an opposite attachment section of the connecting element. This has the advantage that the base plate and the dividing wall are aligned opposite one another. A particularly uniform cavity is obtained. The connection is preferably made by a welding method. Also possible are adhesive bonding, pressing and any other suitable joining method, in particular a joining method involving material connection. Detachable assembly, e.g. by screwing, is also possible. The base plate is preferably screwed to the connecting element. This allows particularly simple access for maintenance purposes, for example. The dividing wall is preferably joined materially to the connecting element, e.g. by welding. Such a connection is inexpensive to produce and reliable. Moreover, the fluid tightness of the dividing wall is not disadvantageously affected thereby.

In an advantageous embodiment of the method, at least one production step is performed from a group of production steps which comprise the mounting of at least one transverse web on the dividing wall, the mounting on the dividing wall of at least one fastening element designed for installing the battery modules, attaching at least one cooling section of a cooling device for controlling the temperature of the battery modules to the dividing wall and mounting at least one battery cover on a transverse web.

BRIEF DESCRIPTION OF THE DRAWINGS

Further advantages and features of the present invention will become apparent from the illustrative embodiment, which is explained below with reference to the attached figures.

In the figures.

DETAILED DESCRIPTION OF THE INVENTION

Figure 1:
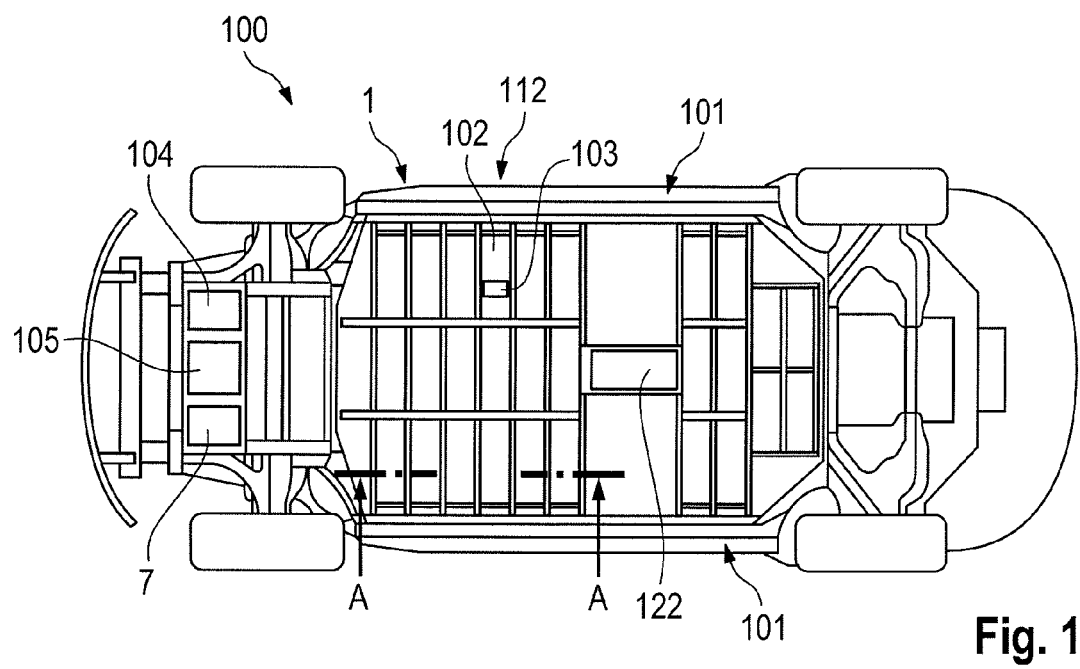
FIG. 1 shows a schematic bottom view of a vehicle having a battery device according to aspects of the invention.

FIG. 1 shows the underside of an at least partially electrically operated vehicle 100 having a battery device 1 according to aspects of the invention. For greater clarity, components which would otherwise be concealed by other components have been shown. Here, the vehicle 100 is designed as an electric vehicle. The vehicle 100 can also be a hybrid vehicle.

The battery device 1 supplies an electric traction drive 105 with energy and is here designed as an underfloor traction battery, which is arranged between the sill regions 101 of the vehicle 100. The battery device 1 is effectively connected to power electronics 104. The battery device 1 can also comprise other components, e.g. a control unit and/or a charger. In order to ensure optimum temperature control of the battery device 1 during operation and during charging processes, a cooling device 7 is provided.

The battery device 1 comprises a plurality of battery modules 102, which each have a plurality of battery cells 103. For greater clarity, only one cell has been depicted by way of example. The battery modules 102 are arranged in a receiving device 2 and are gathered into module groups 112. Here, by way of example, a module group 112 consists of three battery modules 102 arranged adjacent to one another, transversely to the longitudinal axis of the battery device 1. Here, for example, the battery device 1 comprises another module group with a battery module 122 arranged parallel to the longitudinal axis of the battery device 1.

Figure 2:
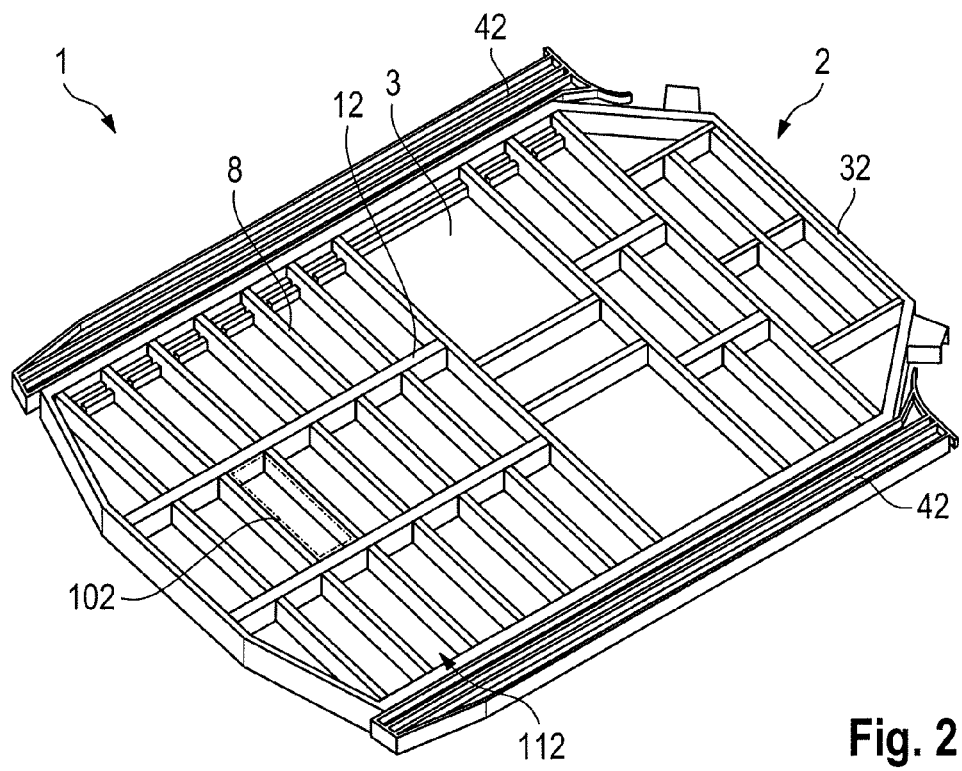
FIG. 2 shows a schematic perspective view of a battery device.

In FIG. 2, the battery device 1 is shown in a perspective view with a battery module 102 depicted by way of example. The battery modules 102 are fixed on a dividing wall 3 of the receiving device 2. Here, the receiving device 2 comprises transverse webs 8 and longitudinal beams 12, which extend between the battery modules 102.

Connecting elements 5 extend parallel to the transverse webs 8 underneath the dividing wall 3. Here, the receiving device 2 comprises a framework 32 and lateral coupling devices 42, which are designed for attachment to the body of the vehicle 100.

Figure 3:
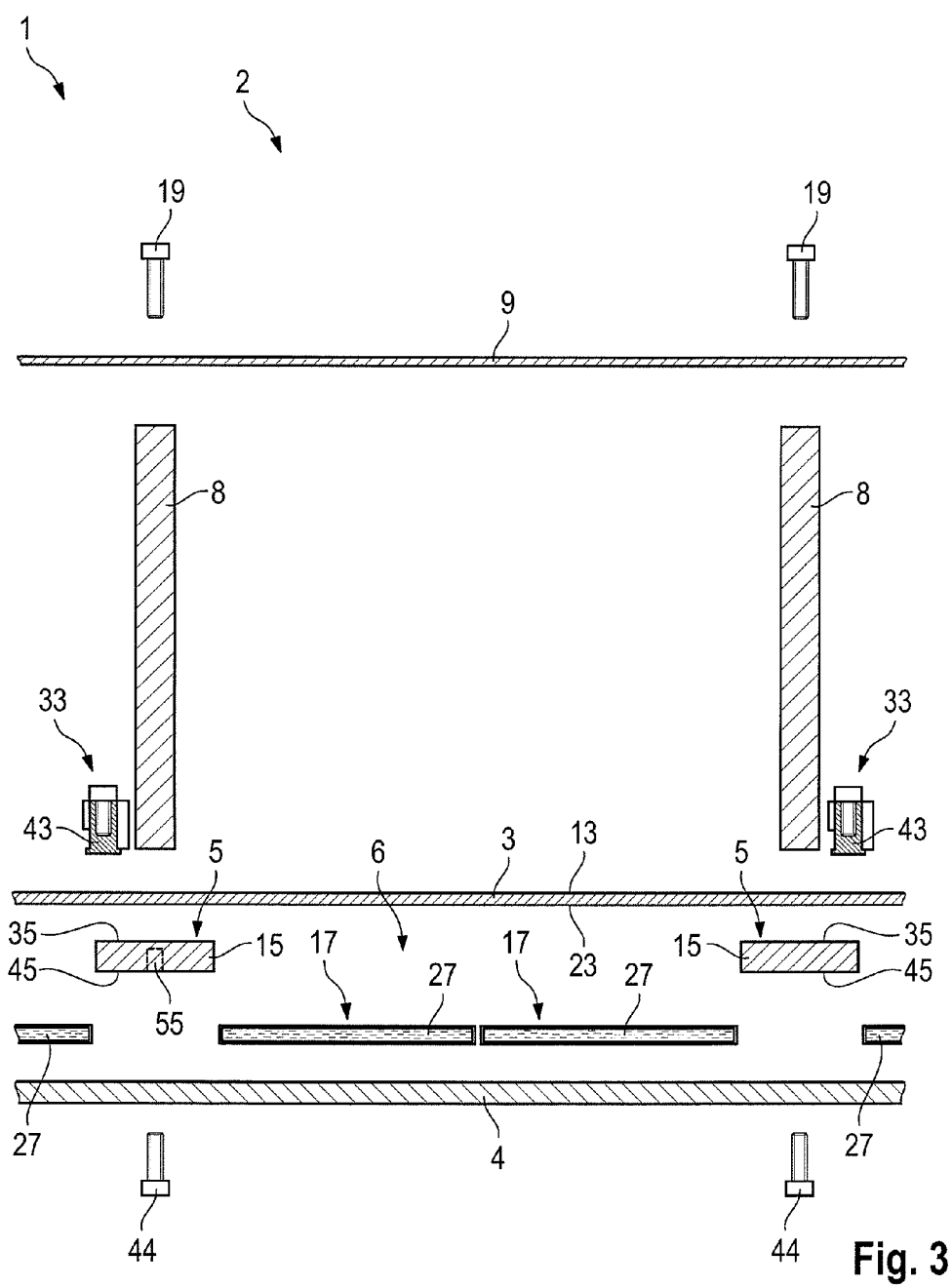
FIG. 3 shows a highly schematized detail of the battery device according to FIG. 1 in an exploded view section along the line A-A.
Figure 4:
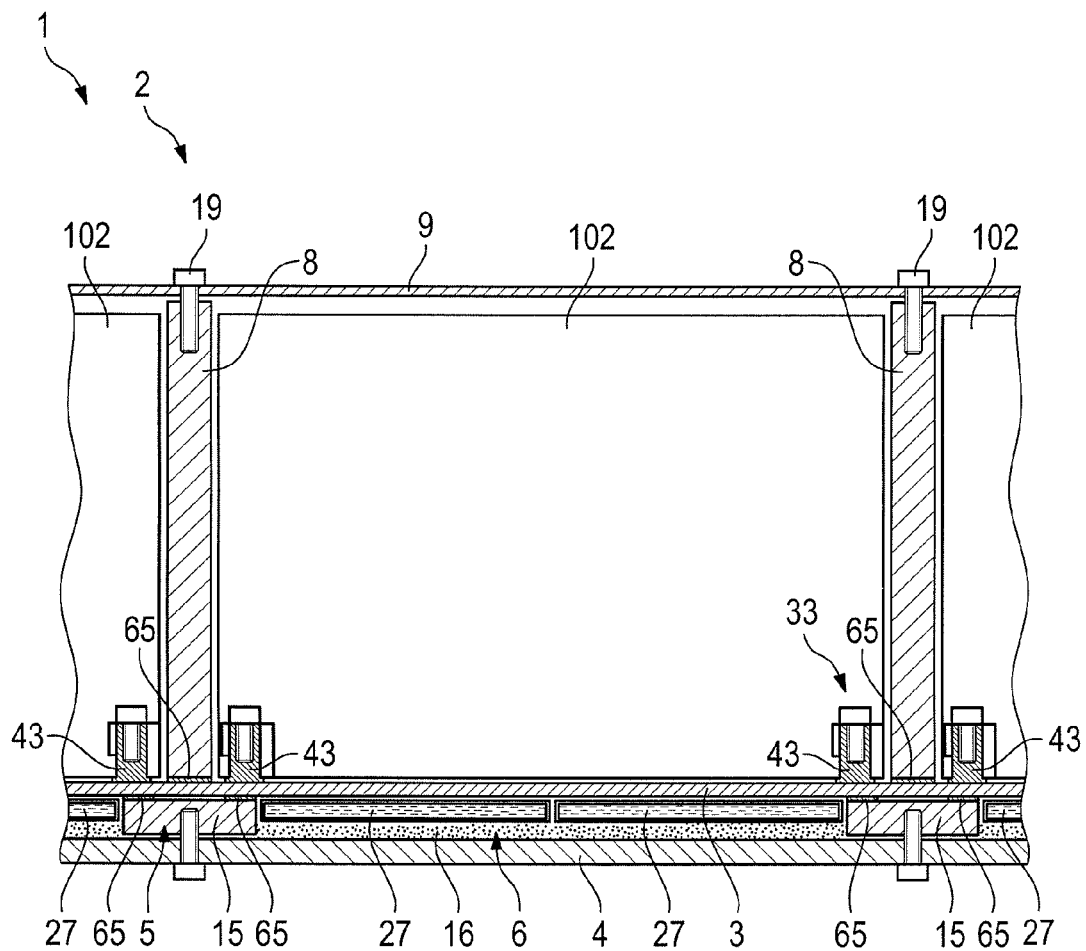
FIG. 4 shows the battery device according to FIG. 3 in an assembled view.

FIGS. 3 and 4 show a detail of the battery device 1 of FIG. 1 in a section along the line A-A. The battery modules 102 are arranged on the dividing wall 3 and are fixed by means of fastening elements 33. Here, the fastening elements 33 are designed as weld studs 43, which are welded to the upper side 13 of the dividing wall 3. The battery modules 102 are preferably each screwed to a plurality of weld studs 43. Transverse webs 8 extend between the battery modules. A battery cover 9 is provided to cover the battery device 1, said cover here being fixed to the transverse webs 8.

Connecting elements 5, which are here designed as elongate connecting profiles 15, are arranged on the lower side 23 of the dividing wall 3. The longitudinal axis of the connecting profiles 15 extends transversely to the longitudinal axis of the battery device 1, which here corresponds to the axis of the direction of travel of the vehicle 100. The connecting elements 5 are arranged spaced apart and parallel to one another. Here, the spacing between the connecting elements 5 corresponds to the spacing between the transverse webs 8 arranged on the upper side 13 of the dividing wall 3. The spacing between the transverse webs 8 is dimensioned in such a way that the battery modules 102 can be inserted between them. The connecting elements 5 and the transverse webs 8 are aligned on the respectively opposite side of the dividing wall 3 so as to be centered relative to one another in respect of their centerlines.

The base plate 4 is arranged underneath the dividing wall 3. In this case, the base plate 4 is likewise fixed on the connecting elements 5. The connecting element 5 has a respective attachment section 35, 45 on each of two opposite sides. The dividing wall 3 is attached to the upper attachment section 35. The base plate 4 is attached to the lower attachment section 45. The connecting element 5 spaces the dividing wall 3 apart from the base plate 4, with the result that a cavity 6 is formed between them.

Cooling sections 17 of the cooling device 7 are arranged in the cavity 6. Here, the cooling sections 17 are designed as cooling channels 27, through which a liquid or gaseous cooling medium flows. The longitudinal axis of the cooling channels 27 extends parallel to the connecting elements 5. A foam material 16 can be arranged in the remaining region of the cavity 6, for example. Other stabilizing and/or insulating materials are also possible. Air can also be provided in the cavity 6.

Here, the cooling channels 27 are arranged underneath and along the battery modules 102, with the result that the heat thereof is transferred to the medium flowing through the cooling channels 27. For this purpose, the cooling channels 27 are preferably connected in a heat-conducting manner to the dividing wall 3. For example, the cooling channels 27 are manufactured from a hollow metal profile and brazed to the dividing wall 3. The dividing wall 3 is preferably manufactured from a metal sheet. Particularly good heat transfer from the battery modules 102 to the cooling medium and thus a particularly good cooling effect is thus obtained.

The battery device shown here has been produced by the method according to aspects of the invention. Production is performed by the steps presented below, for example. In this case, the sequence presented or some other meaningful sequence can be provided.

In a first step, the transverse webs 8 are fixed on the dividing wall 3. For this purpose, a laser welding method is preferably used. Other welding methods or, alternatively, adhesive bonding methods can preferably also be used. The transverse webs 8 and the dividing wall 3 are preferably manufactured from a metal sheet, e.g. made of aluminum or steel. The thickness of the transverse webs 8 can be ten millimeters, for example. The thickness of the dividing wall 3 can be three millimeters, for example.

In the next step, the fastening elements 33, which are embodied as weld studs 43, are attached to the dividing wall 3. The fastening elements 33 can also be adhesively bonded, pressed in, riveted or screwed.

In another step, the connecting elements 5 are connected to the dividing wall 3. For this purpose, laser welding methods or other arc welding methods are preferably used. Illustrative positions of welded joints 65 are depicted in FIG. 4. An adhesive bonding method or some other suitable joining technique can also be provided. The connecting elements 5 are preferably prepared from a metal sheet, e.g. one made of aluminum or steel. The connecting elements 5 have a thickness of eight millimeters and a width of 30 mm, for example. Their length is dimensioned in such a way that the connecting elements 5 extend over the width of the battery device 1 in a suitable manner.

In a further step, the cooling channels 27 are fixed on the dividing wall 3, preferably by means of a brazing method. The cooling channels 27 are manufactured from an extruded aluminum material, for example.

The base plate 4 is then attached to the connecting elements 5. A detachable connection is preferably provided. The base plate 4 is fixed on the connecting elements 5 by means of screw elements 44 and, in particular, screws, for example. For this purpose, the connecting elements 5 can have mounting devices 55, e.g. a press-fit bushing or a threaded bore. The base plate can also be fixed on the connecting elements 5 by means of adhesive bonding or welding methods and, in particular, a plug welding method. The base plate is preferably manufactured from an aluminum or steel sheet. The base plate 4 can also be constructed from a fiber-reinforced plastic or from a multi-material sandwich plate, which can comprise both plastics and metallic materials. The thickness of the base plate 4 is six millimeters, for example.

The battery modules 102 are then inserted between the transverse webs 8, connected and screwed in by means of the fastening elements 33 on the dividing wall 3.

To close off the battery device 1 from the top, a battery cover 9 is mounted on the transverse webs 8. For this purpose, screw elements 19 and, in particular, screws are preferably used. Other detachable or permanent connections are also possible. The battery cover 9 is preferably manufactured from an aluminum or steel sheet. Other materials, such as fiber-reinforced plastics or multi-material sandwich plates, can also be provided. The thickness of the battery cover 9 is 2 mm, for example.

By means of the dividing wall 3 and the base plate 4 and its connection to the connecting elements 5, the battery device 1 presented here offers a particularly stiff and leak tight base structure, which can furthermore be produced economically. The battery modules 102 can be cooled very well and, at the same time, are delimited in a fluid tight manner. In the event of a crash and in the case of effects coming from the ground, the base structure offers reliable protection. Moreover, the overall stiffness of the body is improved.

What is claimed is:

1. A battery device for an at least partially electrically operated vehicle having a plurality of battery modules, each battery module having at least one battery cell, said battery device comprising:
   at least one receiving device for receiving the battery modules, wherein the receiving device comprises at least one dividing wall arranged beneath the battery modules, and at least one base plate arranged beneath the dividing wall, and wherein the dividing wall and the base plate are attached to at least one connecting element and are connected to one another by the connecting element while being spaced apart such that at least one cavity is formed between the dividing wall and the base plate, and the connecting element is positioned within the cavity; and
   at least one cooling device is positioned within the cavity for controlling a temperature of the battery modules.

2. The battery device as claimed in claim 1, wherein the dividing wall and the base plate are fixed on two mutually opposite attachment sections of the connecting element.

3. The battery device as claimed in claim 1, wherein the connecting element is an elongate connecting profile.

4. The battery device as claimed in claim 1, wherein a longitudinal axis of the connecting element extends transversely to a longitudinal axis of the battery device.

5. The battery device as claimed in claim 1, wherein the connecting element has at least one mounting device for detachably fixing the base plate.

6. The battery device as claimed in claim 1 further comprising a plurality of connecting elements arranged adjacent to one another or parallel to one another.

7. The battery device as claimed in claim 1, wherein at least one module group having at least one battery module of the plurality of battery modules is arranged along the cavity.

8. The battery device as claimed in claim 1, wherein the cooling device is attached in a heat-conducting manner to the dividing wall.

9. A battery device for an at least partially electrically operated vehicle having a plurality of battery modules, each battery module having at least one battery cell, said battery device comprising:
   at least one receiving device for receiving the battery modules, wherein the receiving device comprises at least one dividing wall arranged beneath the battery modules, at least one base plate arranged beneath the dividing wall, and transverse webs mounted to and extending above the dividing wall, the transverse webs dividing the receiving device into separate compartments, each separate compartment being sized to receive one of the battery modules of the plurality of battery modules such that each battery module is positioned above the dividing wall and between two transverse webs, and
   wherein the dividing wall and the base plate are attached to at least one connecting element and are connected to one another by the connecting element while being spaced apart.

10. The battery device as claimed in claim 9, wherein each transverse web is mounted on an upper side of the dividing wall in a section where the connecting element is mounted on a lower side of the dividing wall.

11. The battery device as claimed in claim 9, wherein at least one battery cover is mounted on each transverse web.

12. The battery device as claimed in claim 9, wherein the transverse webs are arranged adjacent to one another or parallel to one another.

13. The battery device as claimed in claim 1, wherein at least one fastening element for installing the battery modules is mounted on the dividing wall.

14. The battery device as claimed in claim 1, wherein at least one component of the receiving device is manufactured from sheet metal, and wherein the component is at least one of the dividing wall, the base plate, the connecting element, the transverse web and the battery cover.

15. A method for producing a battery device for an at least partially electrically operated vehicle having a plurality of battery modules, each battery module having at least one battery cell, and the battery device having at least one receiving device for receiving the battery modules, said method comprising the steps of:
   (a) mounting at least one connecting element on a bottom side of at least one dividing wall provided beneath the battery modules;
   (b) mounting at least one base plate on the connecting element at a location beneath the dividing wall, such that the base plate and the dividing wall are connected to one another by the connecting element while being spaced apart; and
   (c) mounting a plurality of transverse webs to a too side of the dividing wall, the transverse webs and the dividing wall together forming separate compartments, each separate compartment being sized to receive one of the battery modules of the plurality of battery modules such that each battery module is positioned above the dividing wall and between two transverse webs.

16. The method as claimed in claim 15, further comprising at least one of the following steps:
   (d) mounting at least one fastening element on the dividing wall, the at least one fastening element being configured for installing one of the battery modules,
   (e) attaching at least one cooling section of a cooling device for controlling the temperature of the battery modules to the dividing wall, and
   (f) mounting at least one battery cover on the transverse web.

17. The method as claimed in claim 15, wherein step (a) precedes step (b).

* * * * *